June 28, 1960  A. SCHINDEL  2,942,480
STARTER HAVING REVERSE TORQUE RELEASE
Filed Jan. 7, 1959
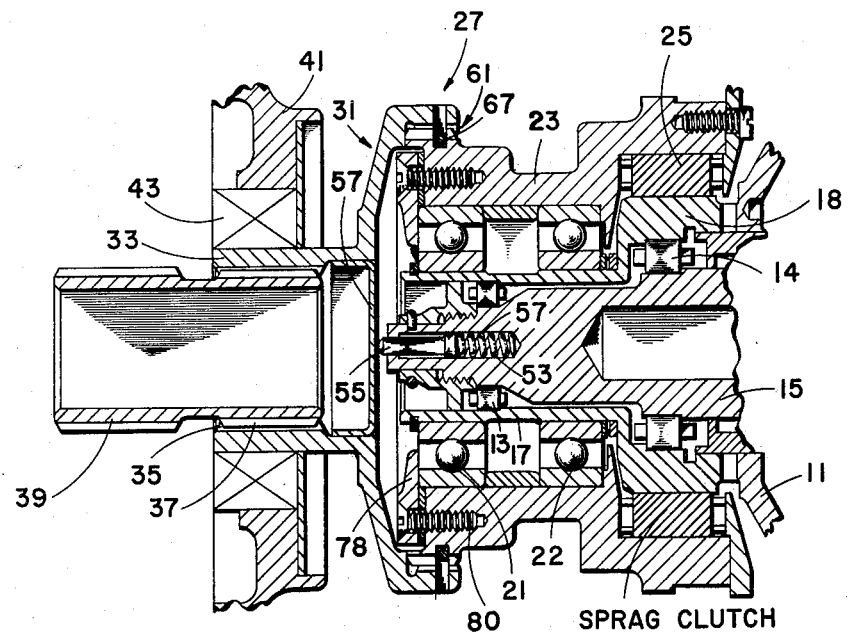
FIG. I
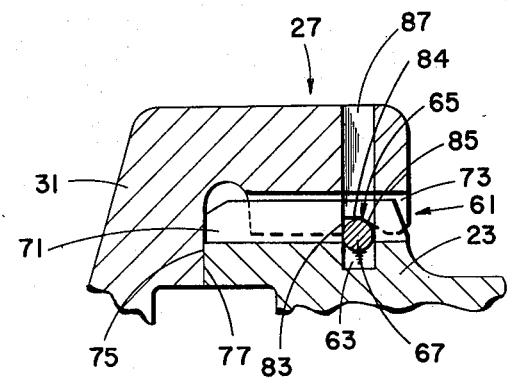
FIG. II
INVENTOR.
ARNOLD SCHINDEL
BY
Robert W. Ely
ATTORNEY

United States Patent Office 2,942,480
Patented June 28, 1960

2,942,480

STARTER HAVING REVERSE TORQUE RELEASE

Arnold Schindel, 18–03 Split Rock Road, Fairlawn, N.J.

Filed Jan. 7, 1959, Ser. No. 785,480

4 Claims. (Cl. 74—7)

This invention relates to drive mechanisms such as aircraft turbine starters and more particularly concerns such starters having a coupling such as a sprag type clutch which permits torque to be transmitted from the starter to the associated engine for starting but prevents the engine from driving the starter after it is started.

In aircraft engine starters using sprag-type clutches, it is necessary to prevent, in case of sprag clutch failure, the aircraft engine from accelerating the starter to destruction. If the sprag clutch fails, the engine can drive the starter gearing and turbine at speeds which cause destruction since such speeds are far in excess of the design speed of the starter. Prior proposals and designs for preventing such damage involved rather complicated constructions which were expensive and difficult to assemble, and which required significant space and added appreciable weight.

An object of the present invention is to provide an improved reverse torque release means for starters having overrunning arrangements.

A further object is to provide such a release which is more reliable and more economically manufactured than prior devices.

Another object is the provision of an improved aircraft starter having a sprag clutch and a reverse overload release which has a helical spline held by simple arrangement at the mating splines until a predetermined reverse torque is generated.

The realization of the above objects along with the features and advantages of the present invention will be apparent from the following description and the accompanying drawing in which:

Fig. 1 is a side cross-sectional view of a starter having sprag clutch, a helical spline and a lock ring which is held in circumferential grooves; and Fig. 2 is an enlarged side view of the helical spline section of Fig. 1.

Referring to Fig. 1 of the drawing the gear member 11 of a turbine starter gear train is rotatably mounted by roller bearings 13 and 14 longitudinally spaced on the axially-extending stationary support member 15. Tubular gear member 11 has small-diameter engine section 17 and a large-diameter inner section 18. Section 17 closely surrounds the engine end of support member 15 and supports ball bearings 21 and 22 on which output barrel member 23 is rotatably mounted.

A conventional overrunning sprag-type clutch 25 connects the inner section 18 of the gear member 11 to the inner end of the surrounding output member 23 so that the starter can drive the engine, but the engine cannot drive the starter. The output member 23 has reverse torque release means 27 (to be described) at its engine end separably connecting it to an overhanging flange of an engine coupling member 31. The engine coupling member 31 has a reduced-diameter tubular section 33 which has internal axially-extending spline 35. Spline 35 mates with spline 37 of engine member 39 so that coupling member 31 can move axially to the left or toward the engine end of the engine member 39 which connects to the jet engine of an aircraft. Starter housing 41 (shown in part) which connects to the engine housing and supports the axial stationary member 15 by a rightward extension (not shown) confines a conventional annular seal device 43 which contacts engine coupling member 31.

A spring-biased means which is comprised of a spring 53 and carbon rod 55 is mounted in an axial hole 57 in the engine end of the support member 15. The rod 55 abuts plate 57 of engine coupling member 31. Means 51 is arranged to lightly urge the engine coupling member 31 to the left so that, when member 31 is disconnected from the output member 23 it will not contact the output member.

With reference to Fig. 2 the reverse torque release means 27 is basically comprised of a helical connection 61, between members 23 and 31, grooves 63 and 65 and a lock ring 67. The output member 23 has a right-hand male helical spline 71 with grooves 65, while the engine-coupling member 31 has a mating female spline 73 with grooves 65. This provides for clockwise cranking as facing the engine pad. The engine-coupling member 31 overhangs or surrounds the output member 23 and has a flat annular surface 75 facing the flat annular surface of the engine end 77 of the output member 23. Ring 67 is a split, tempered-steel toroidal ring having a diameter such that ring 67 bears against grooves 65 in the female spline 73 thereby containing the assembly. In cranking, the reactive loads on engine-coupling member 31 cause it to move to the right into contact with the flat annular surface at the engine end 77 of output member 23. An annular bearing retainer plate 78 is attached to the engine end of member 23 by screws 80. It is to be noted that the arrangement of the release means 27 and bearing retainer 78 provides a compact structure.

The grooves 63 in the male spline of the output member 23 extend radially a distance such that ring 67 can be compressed inwardly of the base part of the male spline 71 or, stated differently, the top of the female spline 73. The grooves 65 in the female spline 73 have a radial side wall 83, a flat bottom 84 and an inclined side wall or chamfer 85 which is inclined radially-inwardly away from the engine end. This construction including inclined surface 85 facilitates the unscrewing of the engine-coupling member because female splines 73 can easily move over ring 67, depressing it into grooves 63. Radial holes 87 are provided in coupling member 31 at the vertical plane of grooves 65 for disassembly of the helical coupling 61. By insertion of a pin-type tool, ring 67 can be compressed and member 31 removed by withdrawing leftward in the spline.

In operation, the starter cranks the engine to starting speed and, when the starter is de-energized, the engine overruns the starter. When cranking, the reactive loads on the engine-coupling member 31 cause it to move rightward so that the ring 67 is not constraining the assembly and reaction is taken on the flat surface of output end 77. Upon de-energizing the starter after the engine is running and assuming a defective clutch 23, the reverse torque release means 27 is actuated to prevent the engine from driving the starter. Reaction due to frictional loads is carried through the helical spline connection 61, tending to separate the engine-coupling member 31 from the output member 23. Member 31 will tend to move leftward since the output member 23 is fixed axially. The geometry of grooves 65 and ring 67 and the radial preload of the ring are designed to prevent such relative motion until a predetermined reactive torque value is reached. At this time, the radial component of force at ring 67 and the contact circle of inclined wall 85 causes split ring 67 to deflect to become a ring of smaller diameter. With ring 67 deformed into the bottom of grooves 63 and radially-inward of the top of the female splines 73, there is no axial restraint on coupling member 31 and it moves leftward out of engagement with output member 23. This movement results due to a reactive load and is aided by spring-biased carbon rod 55. This rod will maintain the engine-coupling member (driven by the engine) out of contact with the male spline 71. Upon shut-down of the engine, it is apparent that the release does not re-engage. After correcting the malfunctions, the release must be manually re-engaged by matching the splines and moving member 31 to the right.

It is to be understood that persons skilled in the art can make changes in the disclosed embodiment without departing from the invention as set forth in the appended claims.

What is claimed is:

1. In a high speed starter for aircraft jet engines, a stationary axial-extending support member, a tubular gear member rotatably supported on said stationary member, a barrel output member rotatably supported on said gear member, one-way drive means connecting said barrel output member to said tubular gear member, an engine coupling member, the engine end of said coupling member having an axial spline for connection to an engine member, reverse torque release means connecting the engine end of said output member to said coupling member, spring-biased means carried by said stationary member contacting said coupling member, said reverse torque release means including separable mating structure having inclined surfaces on said output member and said engine coupling member, said mating structure being constructed to separate due to axial forces when said engine coupling member tends to rotate said output member, said release means further including a split lock ring arranged to prevent relative movement between said inclined surfaces until a predetermined reverse torque is exerted by said engine coupling member, said spring-biased means being arranged to axially position said coupling member to hold said inclined surfaces in spaced relation when separated.

2. In a high speed starter for aircraft jet engines, a stationary axial-extending support member, a tubular gear member rotatably supported on said stationary member, a barrel output member rotatably supported on said gear member, a sprag clutch connecting said barrel output member to said tubular gear member, an engine coupling member, the engine end of said coupling member having an axial spline for connection to an engine member, reverse torque release means connecting the engine end of said output member to said coupling member, spring-biased means carried by said stationary member contacting said coupling member, said reverse torque release means including separable mating structure having inclined surfaces on said output member and said engine coupling member, said mating structure being constructed to separate due to axial forces when said engine coupling member tends to rotate said output member, said release means further including a split lock ring arranged to prevent relative movement between said inclined surfaces until a predetermined reverse torque is exerted by said engine coupling member, said spring-biased means being arranged to hold said coupling member so that said inclined surfaces are in spaced relation when separated, said engine coupling member having chamfers arranged to help compress said split lock ring when said member tends to rotate said output member.

3. In a high speed starter for aircraft jet engines, a stationary axial-extending support member, a tubular gear member rotatably supported on said stationary member, a barrel output member rotatably supported on said gear member, a sprag clutch connecting said barrel output member to said tubular gear member, the engine end of said output member having an external helical spline, an engine coupling member having an internal helical spline mated on the external helical spline of said output member, the engine end of said coupling member having an axial spline for connection to an engine member, said output member having an outwardly-facing groove through its spline and extending inwardly a predetermined distance beyond the base of said spline, said coupling member having a shallow inwardly-facing groove opposite said outwardly-facing groove, teeth of said output member, spring-biased means carried by said stationary member contacting said coupling member, a resilient split lock ring fitted in said grooves, said lock ring being constructed so that it is urged out of said grooves when a predetermined reverse torque is exerted on said helical connection, said spring-biased means being arranged to hold said coupling member so that said helical connection is in spaced relation when separated.

4. In a high speed starter for aircraft jet engines, a stationary axial-extending support member, a tubular gear member rotatably supported on said stationary member, a barrel output member rotatably supported on said gear member, a sprag clutch connecting said barrel output member to said tubular gear member, the engine end of said output member having an external helical spline, an engine coupling member having an internal helical spline mated on the external helical spline of said output member, the engine end of said coupling member having an axial spline for connection to an engine member, said output member having an outwardly-facing groove of rectangular cross section through its spline and extending inwardly a predetermined distance beyond the base of said spline, said coupling member having a shallow inwardly-facing groove opposite said outwardly-facing groove, said inwardly facing groove having inclined surface extending inwardly and away from the engine end of the spline of the coupling member, spring-biased means carried by said stationary member contacting said coupling member, a resilient split lock ring fitted in said grooves, said lock ring being constructed so that it is urged out of said grooves when a predetermined reverse torque is exerted on said helical connection, said spring-biased means being arranged to hold the parts of said helical connection in spaced relation when separated, said coupling member having radial holes extending therethrough to its groove whereby access to said locking ring is provided.

References Cited in the file of this patent

UNITED STATES PATENTS 2,710,763   Gilbert _____ June 14, 1955

FOREIGN PATENTS 762,644   Germany _____ Oct. 20, 1952

UNITED STATES PATENT OFFICE
CERTIFICATE OF CORRECTION

Patent No. 2,942,480                      June 28, 1960

Arnold Schindel

It is hereby certified that error appears in the above numbered patent requiring correction and that the said Letters Patent should read as corrected below.

In the grant, lines 1, 2 and 3, for "Arnold Schindel, of Fairlawn, New Jersey," read -- Arnold Schindel, of Fairlawn, New Jersey, assignor to Bendix Aviation Corporation, of Utica, New York, a corporation of Delaware, --; line 12, for "Arnold Schindel, his heirs" read -- Bendix Aviation Corporation, its successors --; in the heading to the printed specification, line 3, for "Arnold Schindel, 18-03 Split Rock Road, Fairlawn, N. J." read -- Arnold Schindel, Fairlawn, N. J., assignor to Bendix Aviation Corporation, Utica, N. Y., a corporation of Delaware --.

Signed and sealed this 31st day of January 1961.

(SEAL)
Attest:

KARL H. AXLINE                              ROBERT C. WATSON
Attesting Officer                      Commissioner of Patents